United States Patent
Inanc

(10) Patent No.: US 10,895,662 B2
(45) Date of Patent: Jan. 19, 2021

(54) INELASTIC SPECTRUM MEASUREMENT SYSTEM AND METHOD

(71) Applicant: Baker Hughes Oilfield Operations LLC, Houston, TX (US)

(72) Inventor: Feyzi Inanc, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 41 days.

(21) Appl. No.: 16/224,391

(22) Filed: Dec. 18, 2018

(65) Prior Publication Data

US 2020/0191992 A1 Jun. 18, 2020

(51) Int. Cl.
*G01V 5/10* (2006.01)

(52) U.S. Cl.
CPC .................... *G01V 5/102* (2013.01)

(58) Field of Classification Search
CPC ...................................... G01V 5/102
See application file for complete search history.

(56) References Cited

U.S. PATENT DOCUMENTS

| | | |
|---|---|---|
| 8,969,793 B2 | 3/2015 | Stoller et al. |
| 9,057,794 B2 | 6/2015 | Xu et al. |
| 2014/0116776 A1* | 5/2014 | Marx ................ E21B 47/00 175/24 |
| 2015/0226874 A1 | 8/2015 | Inanc et al. |
| 2018/0335546 A1* | 11/2018 | Inanc ................ G01V 13/00 |

OTHER PUBLICATIONS

W.J. Nellis, "Slowing-down distances and times of 0.1- and 14-MeV neutrons in hydrogenous materials," May 1977, American Journal of Physics, vol. 45, No. 5, pp. 443-446.
International Search Report and Written Opinion issued in International Application No. PCT/US19/65183 dated Feb. 13, 2020.

\* cited by examiner

*Primary Examiner* — Christine S. Kim
(74) *Attorney, Agent, or Firm* — Hogan Lovells US LLP

(57) ABSTRACT

Embodiments of the present disclosure include a method that includes activating a neutron generation unit operable to emit neutrons toward a target for a first period of time. The method also includes recording first measurement data, via a detection unit, during the first period of time. The method further includes deactivating the neutron generation unit after the first period of time. The method also includes processing at least a portion of the first measurement data after the first period of time, the first measurement data being correlated to burst gate. The method includes recording second measurement data, via the neutron detection unit, during a second period of time, the second measurement data being correlated to a capture gate.

17 Claims, 10 Drawing Sheets

INELASTIC SPECTRUM MEASUREMENT SYSTEM AND METHOD

BACKGROUND

1. Field of Invention

This disclosure relates in general to oil and gas tools, and in particular, to systems and methods for downhole measurement operations.

2. Description of the Prior Art

Wellbore operations may deploy one or more measurement modalities in order to interrogate and evaluate properties of a downhole formation. For example, measurement modalities may be used to evaluate wellbore integrity, obtain formation properties, and the like. In various embodiments, pulsed neutron generators may be used to emit neutron radiation into the formation and subsequently detect backscatter radiation or gamma emission. Many neutron detectors preferentially detect thermal neutrons. Furthermore, neutron capture for many prompt gamma reactions also preferentially captures thermal neutrons. Typical neutron generators emit neutrons at a high energy and those neutrons are then thermalized, over time, to interact at a lower energy. The high energy emission period may be referred to as a burst gate and the period of time with thermal neutrons may be referred to as a capture gate or thermal gate. The fast neutrons may cause inelastic scatter that is detected as gamma rays, which may mix with the prompt gammas detected through thermal neutron capture.

SUMMARY

Applicant recognized the problems noted above herein and conceived and developed embodiments of systems and methods, according to the present disclosure, for measurement operations.

In an embodiment, a method includes activating a neutron generation unit operable to emit neutrons toward a target for a first period of time. The method also includes recording first measurement data, via a detection unit, during the first period of time. The method further includes deactivating the neutron generation unit after the first period of time. The method also includes processing at least a portion of the first measurement data after the first period of time, the first measurement data being correlated to burst gate. The method includes recording second measurement data, via the radiation detection unit, during a second period of time, the second measurement data being correlated to a capture gate.

In another embodiment, a computing device includes a microprocessor and memory. The memory includes instructions that, when executed by the microprocessor, cause the computing device to obtain first measurement data from a detection unit, the first measurement data recorded during a burst gate of a neutron generation unit. The instructions also cause the computing device to obtain second measurement data from the detection unit, the second measurement data recorded during a capture gate of the neutron generation unit, the capture gate starting after a waiting period from an end of the burst gate. The instructions also cause the computing device to process at least a portion of the first measurement data during the waiting period. The instructions also cause the computing device to process at least a portion of the second measurement data during the capture gate.

In an embodiment, a system for conducting measurement operations includes a neutron measurement device forming at least a portion of a downhole tool string, the neutron measurement device operable to generate measurement data for detecting a wellbore characteristic. The neutron measurement device includes a neutron generator operable to emit neutrons toward a target and a plurality of detectors fixed relative to the neutron generator and operable to detect gamma rays from the target. The system also includes a microprocessors and memory. The memory includes instructions that, when executed by the microprocessor, cause the system to activate the neutron generator for a first period of time. The instructions also cause the system to record first measurement data during the first period of time. The instructions also cause the system to deactivate the neutron generator after the first period of time. The instructions also cause the system to disregard second measurement data during a second period of time, the second period of time being after the first period of time. The instructions also cause the system to record third measurement data during a third period of time, the third period of time being after the second period of time.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
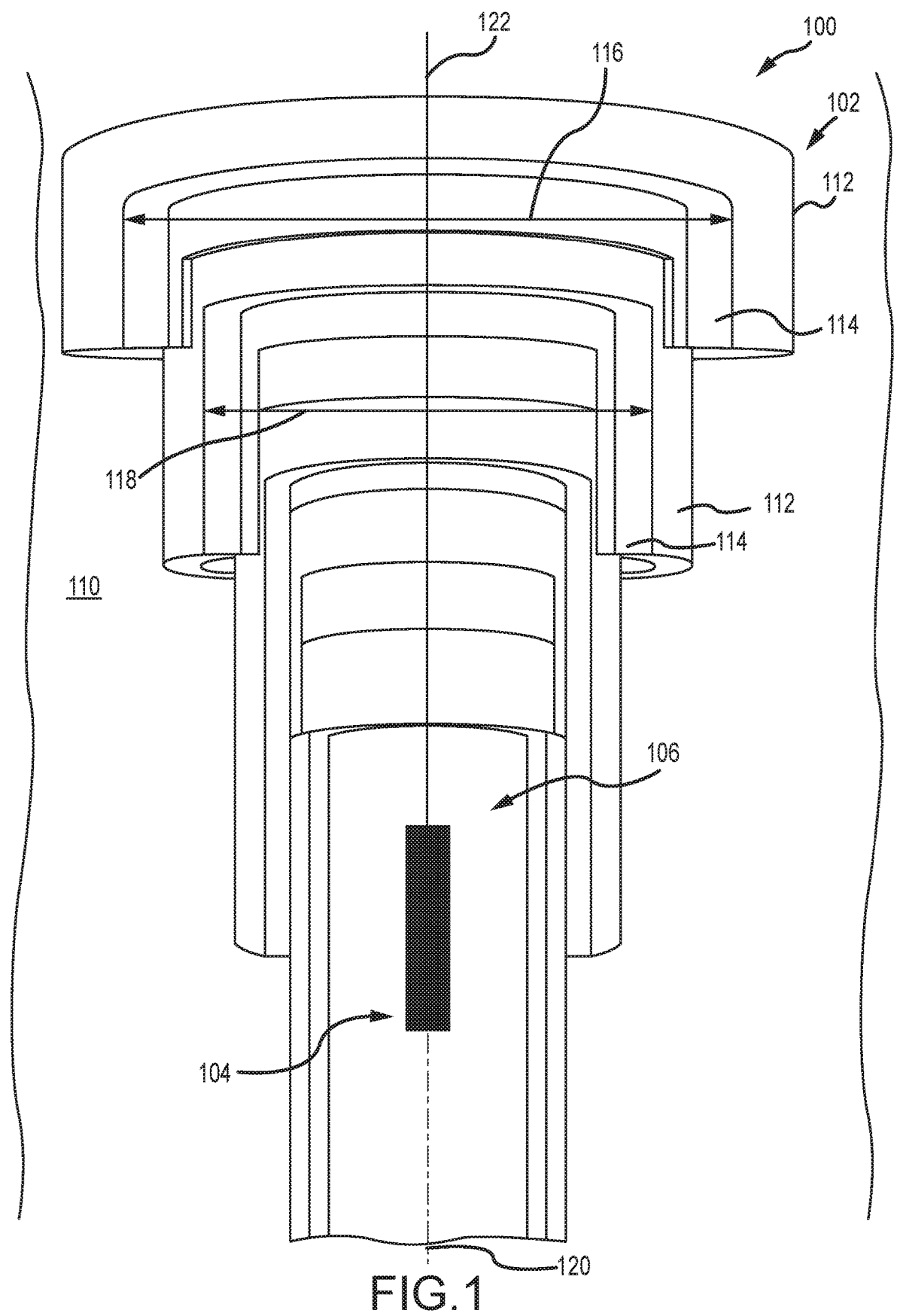
FIG. 1 is a schematic cross-sectional view of an embodiment of a measurement system within a wellbore, in accordance with embodiment of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed to systems and methods for obtaining pure inelastic spectrum in gamma ray detection without subtracting a capture spectrum from a total spectrum. As a result, measurement quality is improved with regard to the inelastic spectrum. For example, in various embodiments, a pulsed neutron generator may be utilized to interrogate a formation with high energy neutrons. The high energy neutrons may interact with the formation and generate inelastic scattering gamma rays, which may be detected by a plurality of detectors, such as gamma ray detectors. As the high energy neutrons interact with various formation components, they may lose energy and become thermal neutrons, which may be absorbed by a certain components of the formation. These components may emit prompt capture gamma rays, which may also be detected by the plurality of radiation detectors. In certain embodiments, the pulse periods between emission of high energy neutrons may be extended to enable thermalization of the high energy neutrons and absorption, thereby reducing the likelihood that prompt capture gamma detection will obscure detection of inelastic scattering gamma rays during the burst gate. In various embodiments, a burst period of time is particularly selected to be less than a thermalization period for high energy neutrons. As a result, a majority of the gamma rays detected during the burst gate will correspond to inelastic scattering reactions. Thereafter, thermal neutron capture may be analyzed. A delay period between pulses may correspond to a period of time for the thermal neutrons to be absorbed above a predetermined threshold. Accordingly, lingering thermal neutrons in the formation may be reduced. As a result, subsequent pulse periods may be correlated to substantially include gamma rays as a result of inelastic scattering, without detecting prompt gammas from previously existing thermal neutrons. To this end, a pure inelastic spectrum may be determined. Furthermore, in various embodiments, data acquisition may be delayed such that the inelastic gamma ray pulse height waveforms acquired during the burst gate are stored and later processed or evaluated during the capture gate. Moreover, data acquired during the capture gate may be analyzed in real time or near-real time.

FIG. 1 is a partial cross-sectional view of a wellbore environment 100 illustrating a multi-barrier well structure 102 and a measurement system 104 arranged as at least a portion of a downhole tool string 106. It should be appreciated that, as used herein, the tool string 106 may refer to one or more downhole tools coupled to a conveyance system that enables logging, perforating, drilling, wellbore intervention, or the like. In various embodiments, the measurement system 104 may be utilized to detect abnormalities or potential defects within a wellbore 108, to determine characteristics of a formation 110, to determine fluid saturation in the formation pore space, or the like. In the illustrated embodiment, the measurement system 104 may include a neutron measurement device configured to interrogate the formation 110 and/or the multi-barrier well structure 102 with neutrons e.g., fast neutrons having energy of approximately 14.1 MeV upon emission from a neutron generator, which may be a pulsed neutron generator) and later detect radiation such as neutron induced capture and inelastic gamma rays, neutrons, or the like.

In the illustrated embodiment, the well structure 102 includes a series of tubular casings 112, which may be metallic, and cement walls 114 between the casings 112. Often, when drilling hydrocarbon wells, a first wellbore diameter 116 is larger than a second wellbore diameter 118. In other words, as the wellbore 108 gets deeper, the diameter decreases. In various embodiments, the wellbore 108 may be cased, as in, lined by the tubular casings 112 and held into place against the formation 110 and/or other casing sections via cement forming the cement walls 114. It may be desirable to inspect the integrity of the casing 112 and/or the cement walls 114, for example for potential abnormalities or defects such as mud channel defects, bonding defects, air voids, defects in the casing, eccentricity of the well. In various embodiments, the defects may be categorized such as annulus defects, casing defects, casing eccentricity, cement bonding defects, and fluid channel defects, among others. These abnormalities or defects may be referred to as wellbore characteristics and may further include additional information such as formation properties and the like. Furthermore, it should be appreciated that, while the illustrated embodiment may include the well structure 102, embodiments of the present disclosure may be used in a non-cased wellbore 108. Additionally, embodiments of the present disclosure may be utilized to determine properties of the wellbore formation, or the like, and reference to detection of anomalies or defects is for illustrative purposes only.

In the illustrated embodiment, the measurement system 104 traverses into the wellbore 108 along a wellbore axis 120 supported by a wireline 122, which may be a cable reinforced for wellbore operations and further including conductive materials to transfer energy and data signals. It should be appreciated that while a wireline system is illustrated in FIG. 1, embodiments of the present disclosure may be disposed on rigid tubing, coiled tubing, and with various other wellbore tubing structures. In various embodiments, the measurement system 104 can determine the integrity of each of the barriers (e.g., casings) of the multi-barrier well and/or the plurality of annuli between the barriers. Further, in various embodiments, the measurement system 104 may obtain measurements indicative of various wellbore or formation properties. The measurement system 104 is deployed at the different depths inside the wellbore 108, and therefore has material and structural integrity to withstand the high pressures and high temperatures at these depths.

It should be appreciated that various embodiments discussed herein describe the measurement system 104 is a neutron measurement tool, which may include a neutron generation unit and a detection unit, which may include radiation detectors to detect a variety of radiation, such as gamma rays, neutrons, and the like. The neutron generation unit may emit a flux of neutron radiation into the formation 110, which may interact with one or more targets and produce a stream of neutron induced gamma rays, neutrons, or the like toward the detection unit. In various embodiments, the neutron generation unit is a pulsed neutron generator that emits neutrons for a period of time and then stops emitting neutrons. For example, the pulsed neutron generator may be a D-D or D-T generator that emits neutrons for approximately 60 microseconds and then stops emitting neutrons for a period of time. As a result, in various embodiments where the neutron generation unit is a pulsed neutron generator, the formation may be initially flooded with high energy fast neutrons, which may be referred to as the burst gate, and then contain predominantly (or entirely in certain embodiments) thermal neutrons during what may be referred to as a thermal gate or capture gate. The neutron detection unit may include a plurality of detectors that detect the presence of backscattered radiation, for example in the form of gamma rays. The detection of the radiation may be referred to as nuclear measurement data and may be utilized to detect the wellbore characteristics. Moreover, the measurement system 104 may include numerous interrogation modalities, each having an excitation assembly for generating the respective beam or signal to make various wellbore measurements. The wellbore measurement information from each measurement modality may be analyzed and fused with data from other measurement modalities. These modalities may include gamma ray, acoustic, electromagnetic measurement modalities. Data from all or a subset of these modalities may be analyzed and data fused in various combinations to gain additional insight and remove confounding factors.

Figure 2:
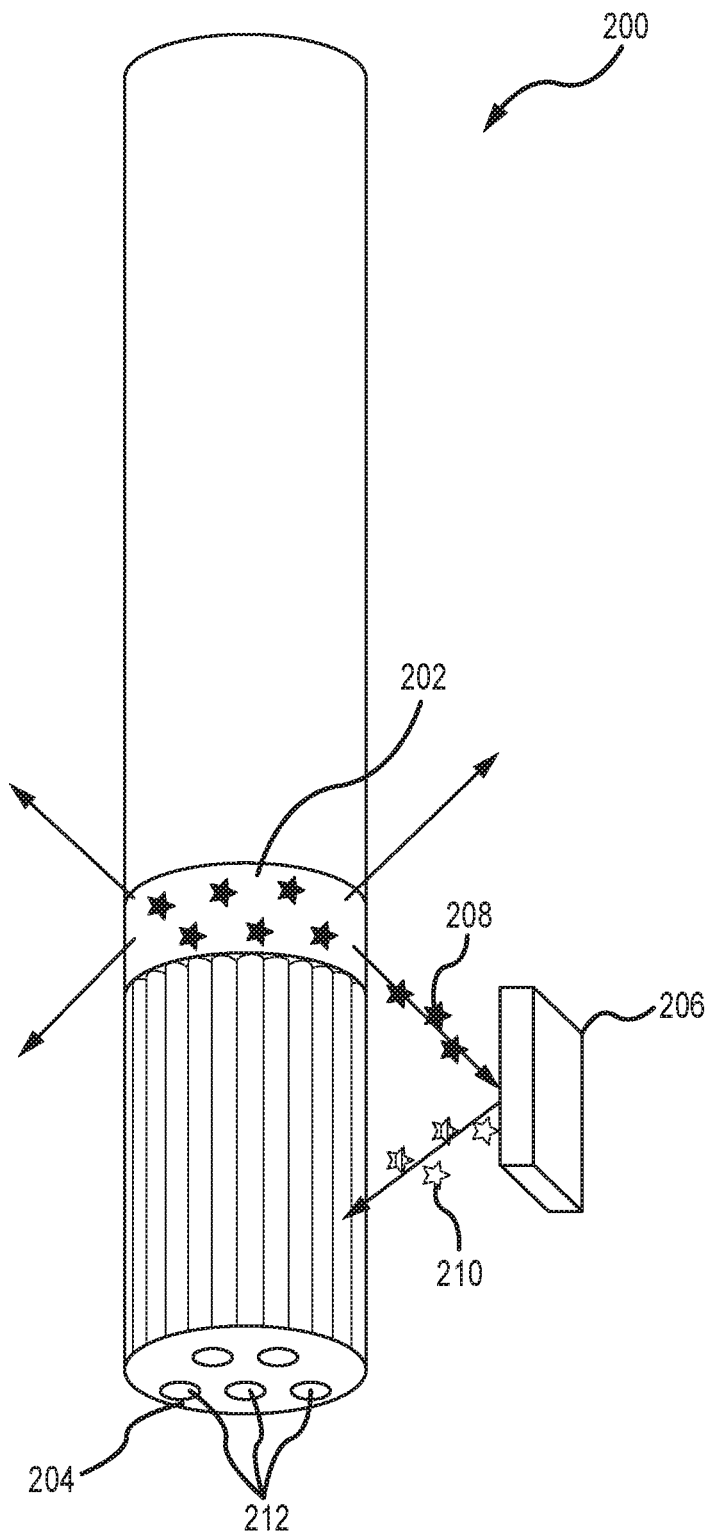
FIG. 2 is a schematic radial cross-sectional view of an embodiment of a measurement system within a wellbore, in accordance with embodiments of the present disclosure.

FIG. 2 is a schematic perspective view of an embodiment of a neutron measurement device 200, which may be the measurement system 104. The illustrated neutron measurement device 200 includes a neutron generation unit 202 and a detection unit 204, which in various embodiments, may be configured to detect various types of radiation, such as gamma rays, x-rays, neutrons, or the like. As discussed above, in various embodiments, the neutron generation unit 202 is a pulsed neutron generator that emits neutrons for a period of time and then stops emitting neutrons for a second period of time. In the illustrated embodiment, the detection unit 204 is fixed relative to the neutron generation unit 202. That is, movement of the neutron generation unit 202 will also be associated with equal movement of the detection unit 204. In various embodiments, the generation unit 302 includes one or more neutron generators to produce neutrons at an energy of approximately 14.1 MeV, which may be termed "fast" neutrons. In embodiments, the neutron generator unit 202 is a pulsed generator that emits a neutron beam for a period of time, ceases to emit the neutron flux for a period of time, and then emits the neutron flux for a period of time. For example, the high-energy radiation (e.g., DD or DT neutrons) may be emitted from the generation unit 202 toward a target 206, such as a portion of the casing 112, portion of the cement wall 114, portion of the formation 110, or any other reasonable downhole feature. The radiation may be emitted for periods of time to enable accumulation of certain types of radiation. For example, as fast neutrons undergo elastic scattering, energy is lost and the neutrons may become thermal neutrons (e.g., neutrons with energy less than 0.8 eV), which may be captured. Neutron capture reactions are accompanied by the emission of capture gamma rays. In various embodiments, the fast neutrons may interact with other nuclei in the formation, leading to inelastic scattering, which may be associated with emission of inelastic gamma rays. Additionally, (n,p) and (n,γ) reactions by the neutrons in the formation 110 may result in unstable nuclei that may decay with emission of activation gamma rays. In embodiments, the detection unit 204 may detect the gamma rays, neutrons, or the like. For simplicity in the following discussion, detection with respect to gamma rays associated with inelastic scattering and capture gamma rays will be discussed herein. Initially, a majority of the neutrons will be fast neutrons, but over time, the fast neutrons will lose energy, for example due to interactions, and become thermal neutrons. The initial load of fast neutrons may be referred to as a burst gate while the later periods with predominantly (or entirely) thermal neutrons may be referred to as a thermal gate or capture gate.

In the illustrated embodiment, a neutron flux 208 may be transmitted radially outward from the generation unit 202. It should be appreciated that, initially, the neutron flux 208 may be mostly high energy, fast neutrons that will interact and thermalize over time. However, some of the fast neutrons may thermalize very quickly, and as a result, the neutron flux 208 may include a combination of both fast and thermal neutrons.

In various embodiments, the neutron flux 208 is a circumferential flux moving radially outward from the generation unit 202. However, in various embodiments, the neutron flux 208 may be directed or otherwise targeted toward a particular location. The neutrons forming the neutron flux 208 interact with the target 208 and a backscatter 210 is produced as a result of the interactions. The backscatter 210 may refer to gamma rays formed through inelastic collisions, thermal neutron capture, and the like. It should be appreciated that, in various embodiments, there may be greater amounts of inelastic gamma rays near the start of or during the burst gate, as the high energy neutrons from the neutron generation unit 202 may cause significant inelastic collision, and then as the neutrons thermalize, capture reactions may take place to release the capture gammas.

In various embodiments, the detection unit 204 includes one or more radiation detectors 212 that may detect gamma rays, neutrons, or the like. For example, in embodiments where gamma rays are being detected, the detectors 212 may include scintillation counters (e.g., thallium-doped sodium iodide, BGO, $LaBr_3$, etc.), and the like. It should be appreciated that the various detectors 212 may be calibrated for use within the downhole environment or to detect energy levels within a specific spectrum. Furthermore, there may be a plurality of detectors within the detection unit 204. It should be appreciated that the type of gamma ray may not be readily determined by the detector 212, and therefore, analysis of various energy peaks is utilized to determine likely properties associated with the wellbore. For example, certain energy levels are associated with capture gamma rays released as a result of capture of neutrons by certain nuclides. Embodiments of the present disclosure may facilitate ready detection of energy peaks associated with different portions of data collection (e.g., burst gate and capture gate) and therefore may provide improved data collection and analysis information.

Figure 3:
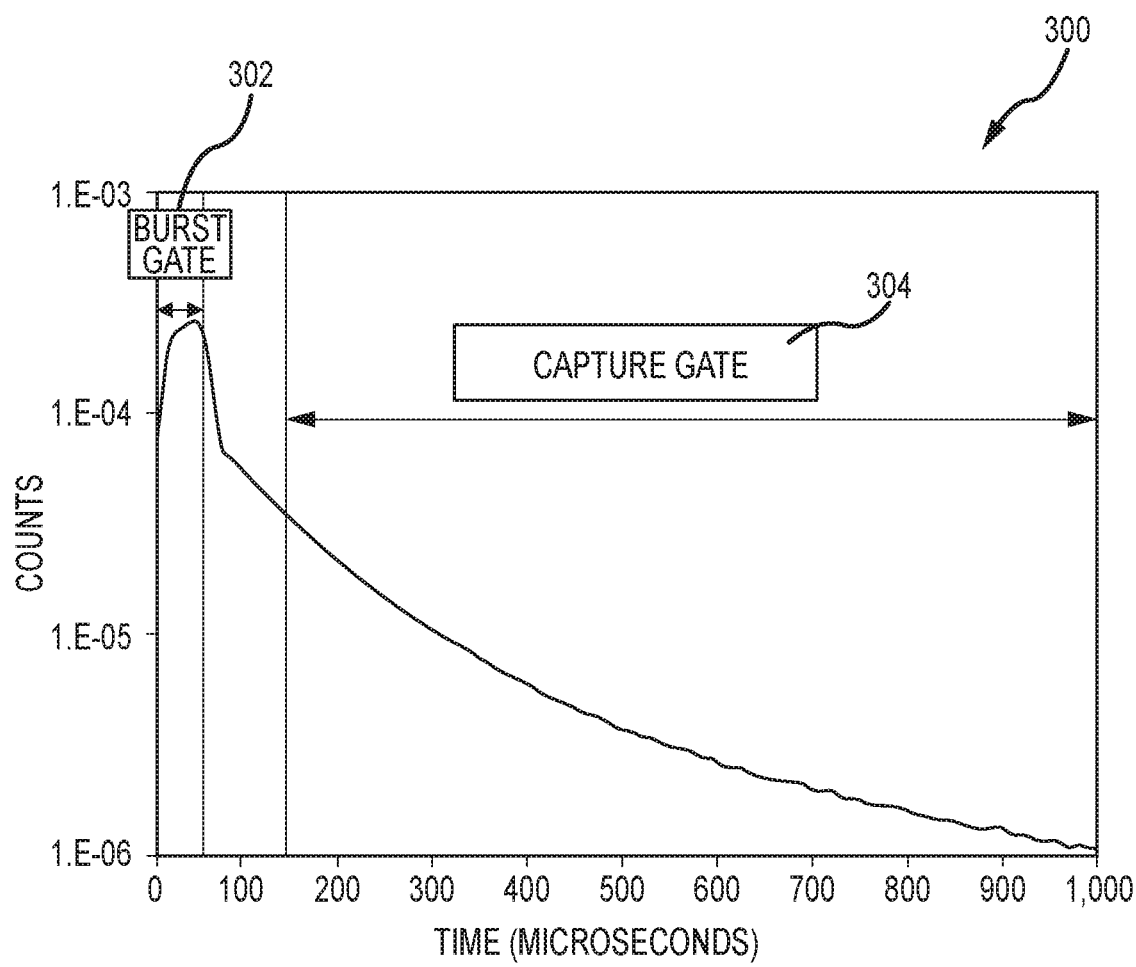
FIG. 3 is a graphical representation of an embodiment of a spectrum from a pulsed neutron generator, in accordance with embodiments of the present disclosure.

During operation, neutrons may be emitted from the neutron generation unit 202 in an isotropic manner. Over time (e.g., 8-50 microseconds) neutrons may be reduced from an initial fast energy level (e.g., 14.1 MeV) to approximately thermal energy levels (e.g., less than 0.8 eV). These thermal neutrons may then be captured by various components of the wellbore, which may produce prompt gamma rays that may be detected by the detection unit 204. FIG. 3 is a graphical representation of an embodiment of a spectrum 300 associated with the neutron generation unit 202, where the neutron generation unit 202 is a pulsed neutron generator. As described above, a pulsed neutron generator emits neutrons for a first period of time, stops emitting neutrons for a second period of time, and then emits neutrons for a third period of time. In the example shown in FIG. 3, the neutrons are emitted for 60 microseconds. However, as will be described below, in various embodiments the pulse period for the generation unit 202 may be different than 60 microseconds. A typical neutron thermalization time is shorter than 60 microseconds, for example it may be as short as 7 to 8 microseconds in hydrogen rich environment. As a result, neutrons may thermalize during the burst gate so that the flux includes both high energy and thermal neutrons. Accordingly, as described above, the detection unit 204 may register gamma rays that result from both inelastic collisions (e.g., fast neutron interactions) and captures (e.g., thermal neutron capture). In other words, during the period of time the neutron generator 202 is emitting neutrons, there may be a mixture of both fast and thermal neutrons within the formation. Moreover, there may also be some thermal neutrons left over from the previous pulsing period. In various embodiments, data acquired in this time period can be called burst gate data, represented by the period identified with 302. Once the neutron emission stops, all high energy neutrons will eventually thermalize and the medium will have only thermal neutrons in the system till the generator starts emitting neutrons again. Any data acquired in that time interval can be called capture gate data, represented by the period identified with 304.

FIG. 3 illustrates the spectrum 300 where the number of counts is higher in the burst gate 302 than the capture gate 304. However, approximately 60 percent to 80 percent of the data acquired in the burst gate 302 may be due to fast neutrons, which will drive inelastic scattering, rather than gamma rays formed by thermal neutron capture. Accordingly, as will be described below, it may be advantageous to delay or otherwise segment data collection during a predetermined time period associated with one of the burst gate or the capture gate. The delay may enable measurement of a pure inelastic spectrum and a pure capture spectrum.

In various embodiments, pulsed neutron measurements are used in formation evaluation. A short list of those measurements can be given as Sigma, C/O, neutron induced gamma ray mineralogy, GasView provided by Baker Hughes, a GE Company (BHGE), and FluidView provided BHGE. In various embodiments, a platform such as Reservoir Performance Monitor (RPM)-C, provided by BHGE, or Formation Lithology eXplorer (FLeX) Service, provided by BHGE, may be deployed for such measurements. Multiple measurement modalities may utilize gamma ray measurement, which can be acquired during the pulse gate or burst gate. In the burst gate, there are gamma rays emitted from inelastic scattering of fast neutrons (e.g., inelastic gamma rays) and gamma rays emitted from the capture reactions (e.g., capture gamma rays). The physics behind the inelastic and capture gamma rays are not the same and spectra formed by those gamma rays are significantly different. For example, an oxygen signature in the capture gamma ray spectra is not present. Moreover, a hydrogen signature is not seen in the inelastic spectra. While recognizing such differences is possible, obtaining a pure inelastic spectrum is difficult. As used herein, pure refers to a spectrum having a quantity of reactions attributable to inelastic scattering greater than a threshold amount. The threshold amount may vary based on the properties of the pulsed neutron generator. For example, the threshold amount may be approximately 50 percent, approximately 60 percent, approximately 70 percent, approximately 80 percent, approximately 90 percent, or any other reasonable amount.

In contrast to the inelastic scattering, obtaining a pure capture spectrum is easier because fast neutrons will thermalize over time. For example, sampling can be conducted after waiting a predetermined time after the emission of fast neutrons has ended and also adding a period of time for the fast neutrons to thermalize. As a result, data acquired in that later time gate will produce a pure capture spectrum.

In various embodiments, the pulsed neutron source is pulsed at a high frequency, and there typically are at least some thermal neutrons in the system when the pulse is induced. With that, there will be an existing thermal neutron component in the burst gate, although the source will introduce a fast energy neutron component. In addition, some of the neutrons will thermalize even before the burst is over and will increase the magnitude of the thermal neutron component. The amount of the thermal neutrons in the burst gate is usually a function of the environment, the pulsing period, and pulsing frequency. As a result, the spectrum acquired in the burst gate will include inelastic gamma rays emitted as a result of fast neutrons going through inelastic scattering reactions and also capture gamma rays emitted through thermal neutron capture. The spectrum measured in the burst gate may be referred to as a total spectrum because it is a sum of both inelastic and capture gamma rays. Obtaining a pure inelastic spectrum usually involves stripping a capture component from the total spectrum measured in the burst gate. Striping the capture component typically involves subtracting some fraction of capture spectrum from the total spectrum, as shown by Equation 1

$$N_{inelastic}(E) = N_{total}(E) - \alpha N_{capture}(E), \quad (1)$$

where $\alpha$ corresponds to a fractional component, which is often determined experimentally. It should be appreciated that $\alpha$ may be a constant value or a dynamically changing value.

The gamma ray spectrum in the burst period is a summation of two components. One of the components is the capture gamma rays generated by the capture of neutrons emitted during the current burst, but already thermalized before the burst is over. That is, fast neutrons that have thermalized and been absorbed. The second component is the capture gamma rays generated by the capture of thermal neutrons that were carried over from the previous pulse periods. As described by W. J. Nellis, (American Journal of Physics, Vol. 45, No. 5, May 1977), the average time for 14.1 MeV neutrons to thermalize down to 0.025 eV energy levels in 8.22E22 hydrogen/cm$^3$ is around 6 microseconds. Clean water has a hydrogen density of approximately 6.7E22 hydrogen/cm$^3$. Since thermalization time is strongly determined by hydrogen density, average thermalization time of 14.1 MeV neutrons in water is likely longer than 6 microseconds. In addition, typical hydrogen densities where the pulsed neutron tools are deployed are significantly lower, resulting in much longer thermalization times. Therefore, if the burst length is kept shorter than approximately 10 microseconds, thermal neutron flux in the burst period will likely be very low. As a result, the first component (e.g., neutrons that are thermalized during the pulse) of the capture gamma ray flux may be decreased to negligible levels. Furthermore, the second component (e.g., carry over thermal neutrons) may be a component of pulse period lengths. For example, if the pulse period is relatively short, there may be substantial carry over from previous cycles. However, the short pulse periods enable favorable counting statistics, although significant capture gamma rays are introduced into the burst gate, thereby reducing the reliability of extracting the pure elastic spectrum. Embodiments of the present disclosure, however, may lengthen the time duration between pulses, and as a result, carry over from previous pulses is reduced. Accordingly, it is possible to obtain total spectra that are substantially pure inelastic spectra. Such spectra do not utilize the stripping step described by Equation 1.

Figure 4A:
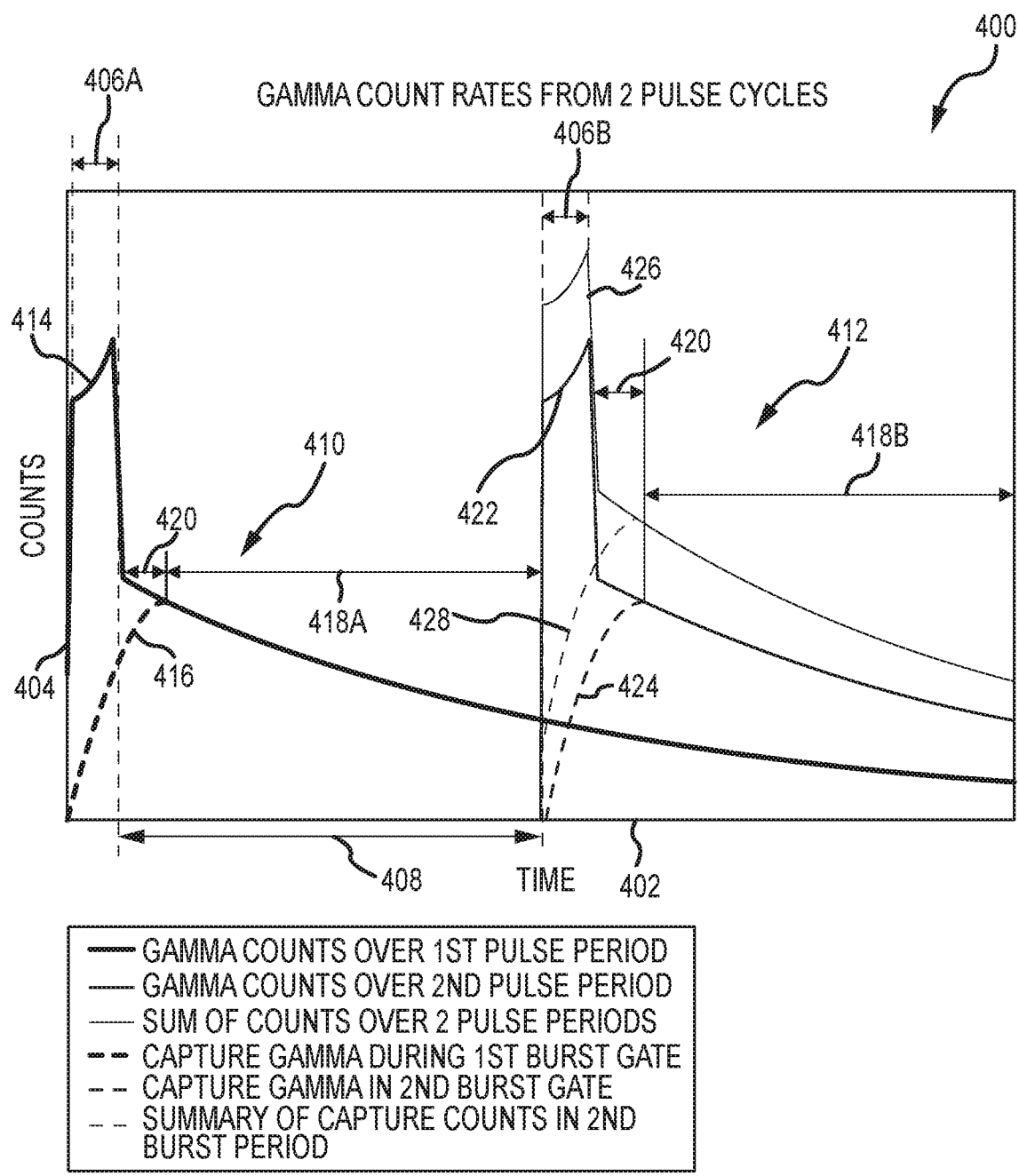
FIG. 4A is a graphical representation of an embodiment of gamma ray counts recorded over a period of time, in accordance with embodiments of the present disclosure.
Figure 4B:
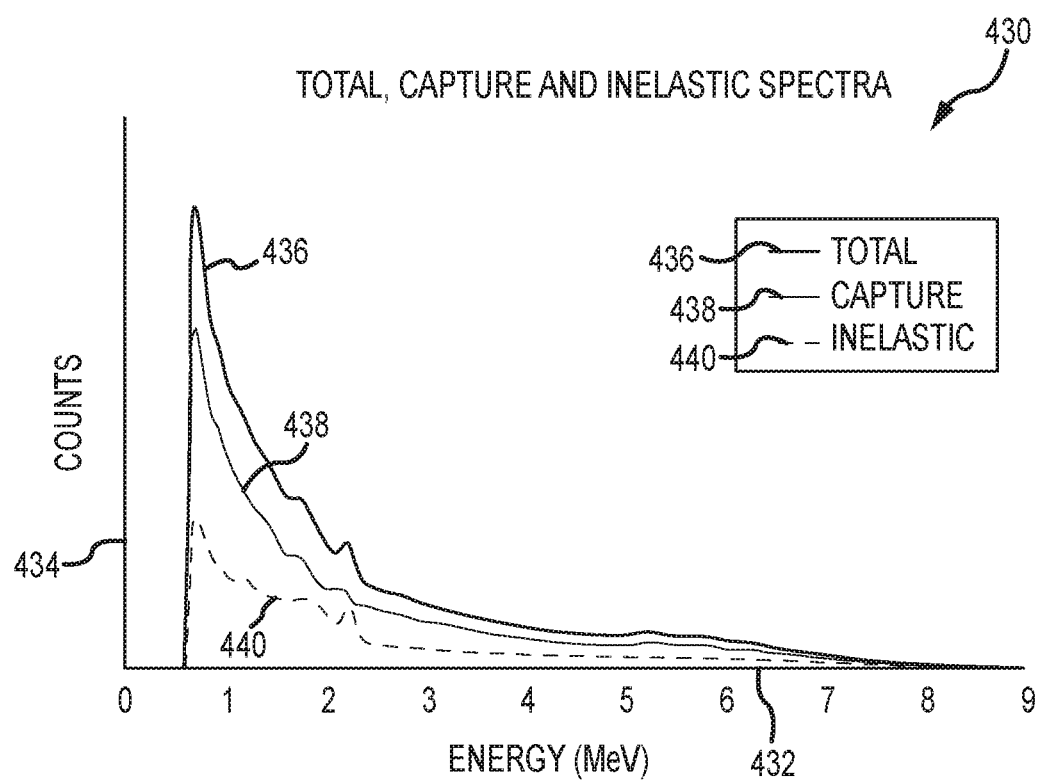
FIG. 4B is a graphical representation of an embodiment of an energy spectrum of gamma ray counts, in accordance with embodiments of the present disclosure.

FIG. 4A is a graphical representation 400 of gamma ray counts over a period of time. In the illustrated embodiment, the x-axis 402 corresponds to time and the y-axis 404 correspond to a number of counts, for example, detected gamma rays. In various embodiments, FIG. 4A may be described as illustrating time spectra, a first burst gate, a first capture gate, a waiting period, a second burst gate, and a second capture gate. Energy spectra are formed in the burst gates and the capture gates, one such example is illustrated in FIG. 4B. The time spectrum formed in the burst gate may be referred to as the total time spectrum and the time spectrum formed in the capture gate may be referred to as the capture time spectrum.

As described above, in various embodiments the pulsed neutron generator may emit neutrons for a first period of time within a burst gate 406A (e.g., a first burst gate), stop emitting for a waiting period 408, and then emit neutrons for a second period of time within the burst gate 406B (e.g., a second burst gate). As a result, a first pulse period 410 and a second pulse period 412 may each include respective time spectra. It should be appreciated that certain portions of the time spectra may also include energy spectra, which will be illustrated in FIG. 4B. In the illustrated embodiment, the first pulse period 410 includes a first total time spectrum 414 that corresponds to the burst gate 406A and a first capture time spectrum 416 that may correspond, at least in part, to a capture gate 418A (e.g., a first capture gate). It should be appreciated that, in various embodiments, neutron capture may occur during the burst gate 406A, as described above, and as a result the first capture time spectrum 416 may begin building within the burst gate 406A. The first pulse period 410 further illustrates a thermalization period 420 between the burst gate 406A and the capture gate 418A. During the thermalization period 420, substantially all of the neutrons within the system may become thermal neutrons. The thermalization period 420 is illustrated by the sharp drop off in gamma ray counts at the end of the burst gate 406A. It should be appreciated that the relative durations of the burst gate 406A, capture gate 418A, and thermalization period 420 are for illustrative purposes only.

The illustrated embodiment shown in FIG. 4A further includes the second pulse period 412 that includes a second total time spectrum 422, a second capture time spectrum 424, and a sum total time spectrum 426. In various embodiments, the second total time spectrum 422 corresponds to the burst gate 406B (e.g., a second burst gate) and the second capture time spectrum 424 correspond to the capture gate 418B (e.g., a second capture gate). As described above, in various embodiments, neutron capture may occur during the burst gate 406B, and as a result the second capture time spectrum 424 may begin building within the burst gate 406B. Furthermore, in various embodiments, residual neutrons from the first pulse period 410 may further lead to additional counts being contributed to the second capture gate 418B. This build up or overlap from the first pulse period 410 is represented by a sum capture time spectrum 428. As illustrated, the sum capture time spectrum 428 is greater than the second capture time spectrum 424. A similar build up is also illustrated in the sum total time spectrum 426, which may include counts from the sum capture time spectrum 428. Accordingly, FIG. 4A illustrates that pulse periods may influence recorded counts in subsequent counting periods. As described above, various embodiments of the present disclosure describe techniques for obtaining a pure inelastic spectrum. In various embodiments, the burst periods may be kept short to avoid thermal neutron buildup and with delay periods long enough to enable the thermal neutrons to dissipate before the subsequent burst period. Accordingly, the pile up of signals illustrated in FIG. 4A may be significantly reduced or avoided while further enabling measurement of a pure inelastic spectrum.

It should be appreciated that the time spectra illustrated in FIG. 4A are representative of total counts and not necessarily energy levels of the radioactive particles that may interact with detectors. For example, the counts during the first burst gate 406A may include a variety of different energy levels, which may be useful in determining material properties of the formation. Each time period may further include an energy spectrum, which may be utilized to determine energy levels of the various counts acquired during the respective time spectra. FIG. 4B illustrates an embodiment of a graphical representation 430 of gamma ray counts over a period of time for particular energy levels, provided in MeV.

In the illustrated embodiment, the x-axis 432 corresponds to energy level (MeV) and a y-axis 434 corresponds to counts. In various embodiments, FIG. 4B may be described as illustrating a plurality of energy spectra, which may be representative of information acquired during a time period, such as the first burst gate, the second burst gate, the first capture gate, the second capture gate, or any other period of time where counts are acquired. In various embodiments, the illustrated energy spectra may be correlated with various time periods to determine properties of the downhole formation.

As shown in FIG. 4B, a first energy spectrum 436 represents a total or burst spectrum. The first energy spectrum 436 may correlate to counts acquired during the burst gates 406A, 406B. A second energy spectrum 438 represents a capture spectrum. The second energy spectrum 438 may correlate to counts acquired during the capture gates 418A, 418B. A third energy spectrum 440 represents an inelastic energy spectrum. The inelastic energy spectrum may be acquired by subtracting the weighted capture spectrum from the total spectrum. However, as described above, this technique is imprecise and may be resource intensive. Accordingly, as will be described below, embodiments of the present disclosure enable acquisition of time and energy spectra where the inelastic portion is substantially equal to the total portion, thereby eliminating stripping the capture portion.

Figure 5:
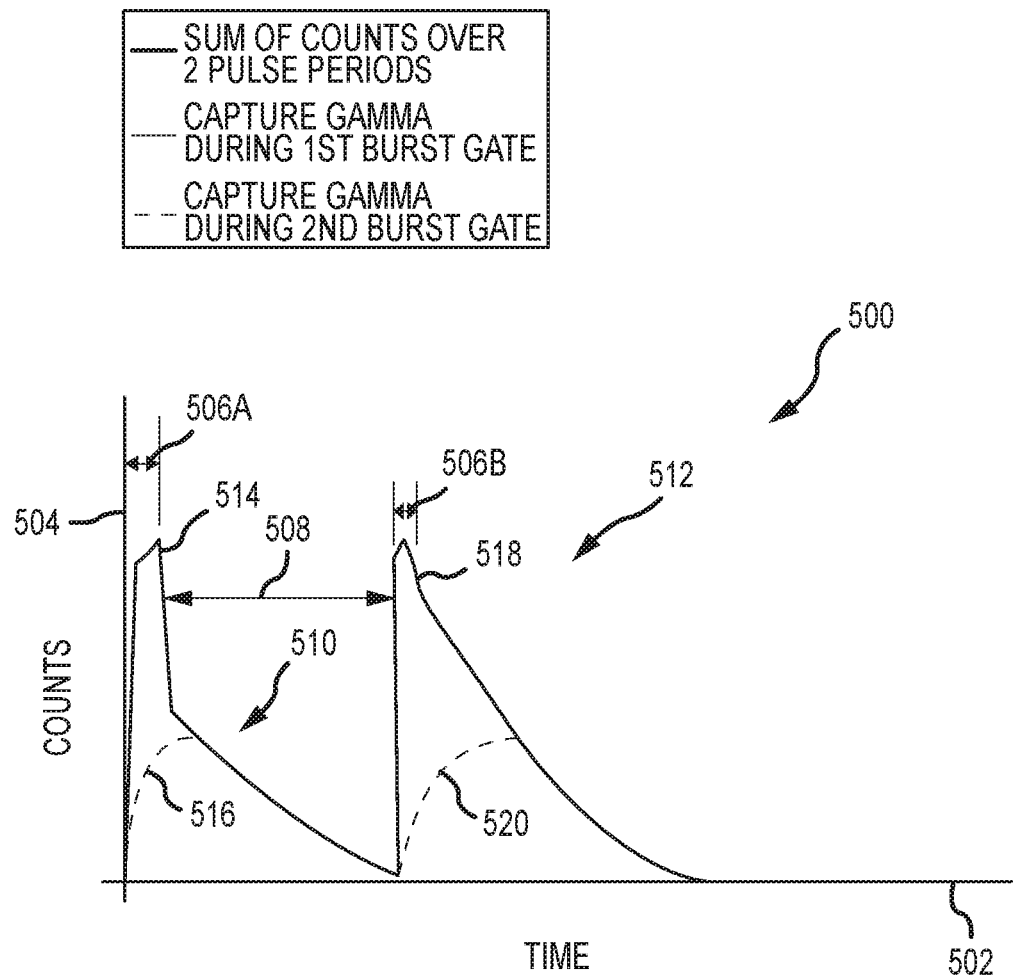
FIG. 5 is a graphical representation of an embodiment of gamma ray counts recorded over a period of time, in accordance with embodiments of the present disclosure.

FIG. 5 is a graphical representation 500 of gamma ray counts over a period of time. In the illustrated embodiment, an x-axis 502 corresponds to time and a y-axis 504 correspond to a number of counts, for example, detected gamma rays. In various embodiments, FIG. 5 may be described as illustrating time spectra, a first burst gate, a first capture gate, a waiting period, a second burst gate, and a second capture gate. Energy spectra may also be formed in the burst gates and the capture gates, for example as illustrated in FIG. 4B. The time spectrum formed in the burst gate may be referred to as the total time spectrum and the time spectrum formed in the capture gate may be referred to as the capture time spectrum. Similar to the representation 400 of FIG. 4A, two different pulse cycles are illustrated where neutrons may be emitted during a burst case.

As described above, in various embodiments the pulsed neutron generator may emit neutrons for a first period of time within a burst gate 506A (e.g., a first burst gate), stop emitting for a waiting period 508, and then emit neutrons for a second period of time within the burst gate 506B (e.g., a second burst gate). As a result, a first pulse period 510 and a second pulse period 512 may each include respective time spectra (which may also include energy spectra within that period of time, as described above). In the illustrated embodiment, the first pulse period 510 includes a first total time spectrum 514 that corresponds to the burst gate 506A and a first capture time spectrum 516. It should be appreciated that, in various embodiments, neutron capture may occur during the burst gate 506A, as described above, and as a result the first capture time spectrum 516 may begin building within the burst gate 506A. However, in certain embodiments, a duration of the burst gate 506A is short enough such that the number of thermal neutrons created is less than a thermal threshold.

As illustrated in the first total time spectrum 514, there is a sharp drop off in counts after the burst gate 506A and the general number of counts decreases over time as a result of the thermalization and interaction of the subsequent thermal neutrons. When comparing the first total time spectrum 514 to the first total time spectrum 414 of FIG. 4A, the burst gate duration is shorter in FIG. 5. For example, the burst gate 406 may be approximately 40 microseconds in FIG. 4A and the burst gate 506 may be approximately 10 microseconds in FIG. 5. It should be appreciated that these times are provided for illustrative purposes only, and that in various embodiments the times may be larger or smaller. As such, the example times should not be construed to limit the duration of the burst gates in any way. As a result, there is a decreased likelihood that a significant amount of thermal neutrons will be generated during the burst gate 506A. This benefit is further illustrated when comparing the first capture time spectrum 516 of FIG. 5 to the first capture time spectrum 416 of FIG. 4A. The first capture time spectrum 516 makes up a significantly smaller portion of the first total time spectrum 514, and as a result, the first total time spectrum 514 is substantially comprised of signals obtained from inelastic scattering as a result of the emitting fast neutrons during the burst gate 506A.

In the embodiment illustrated in FIG. 5, the waiting period 508 is longer than the waiting period 408 illustrated in FIG. 4A. For example, the waiting period 408 may be approximately 60 microseconds while the waiting period 508 may be approximately 1200 microseconds. It should be appreciated that these times are provided for illustrative purposes only, and that in various embodiments the times may be larger or smaller. As such, the example times should not be construed to limit the duration of the waiting periods in any way. In embodiments, the duration of the waiting period may correspond to a time period where a number of thermal neutrons is below an absorption threshold. Accordingly, the number of thermal neutrons remaining from the first pulse period 510 is small, thereby preventing the pile up of spectra described above. For example, in the illustrated embodiment, a second total time spectrum 518 of the second pulse period 512 is substantially equal to the first total time spectrum 514 of the first pulse period 510. Moreover, a second capture time spectrum 520 of the second pulse period 512 is substantially equal to the first capture time spectrum 516 of the first pulse period 510. Because of the increased waiting time 508, the lingering thermal neutrons have a reduced impact on subsequent pulses, and as a result, the inelastic scatting may be determined within the burst gates 506A, 506B with less interference from the respective capture spectra 516, 520. In this manner, a substantially pure inelastic spectrum is obtained.

Figure 6:
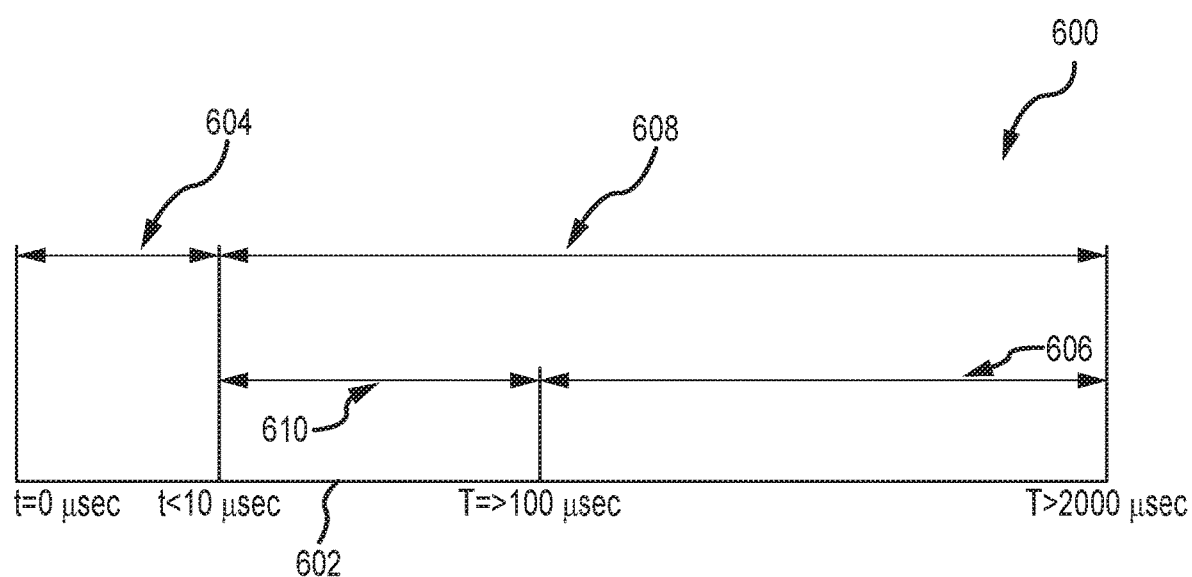
FIG. 6 is a graphical representation of an embodiment of a data processing timeline, in accordance with embodiments of the present disclosure.

FIG. 6 is a representation of a data acquisition event 600 utilizing various embodiments of the present disclosure. In the illustrated embodiment, the x-axis 602 corresponds to time, which may be represented by segments of time. As described above, in a first time period 604 the pulsed neutron generator is activated such that burst gate data may be obtained. In various embodiments, this period of time may be less than approximately 10 microseconds. By keeping the detection period for the inelastic spectra less than approximately the time required for thermalization of fast neutrons, the measurements will be substantially due to inelastic collisions. It should be appreciated that 10 microseconds is presented for example purposes only, and as described above, in various embodiments the time required for thermalization of fast neutrons may be different based on the properties of the formation and/or surrounding materials. Accordingly, embodiments of the present disclosure are directed toward emitting fast neutrons for a period of time below a threshold level, which vary defined by a period of time approximately equal to the time for thermalization of fast neutrons in a given media. In various embodiments, data acquisition takes place during the first time period 604. As described above, the data will be predominantly information directed toward inelastic scattering, as illustrated in FIG. 5. In this manner, the information acquired during the first time period 604 may be correlated to the inelastic spectrum, and may be a pure inelastic spectrum.

In various embodiments, a second time period 606 corresponds to the capture gate. For illustrative purposes, this time period may start at approximately 100 microseconds, or approximately 90 microseconds after the burst gate. The second time period 606 is after the time for thermalization of fast neutrons and, moreover, corresponds to the time period in FIG. 5 after the burst gate 506 (e.g., the capture count in the first period 516). During the second time period 606, the interactions may be a result of capture reactions that emit capture gamma rays due to the absorption of thermal neutrons. Because the neutron generation unit is not emitting during this time period, it is unlikely that high energy neutrons will remain in the system. In the illustrated embodiment, the second time period 606 lasts for approximately 1900 microseconds. It should be appreciated that this is for illustrative purposes only. In various embodiments, the second time period 606 may correspond to the delay period 508. However, in other embodiments, the delay period 508 may be longer than the second time period 606.

In various embodiments, data acquisition systems process data as it comes in. With the digital data acquisition systems, it possible to process the incoming data with a time offset. With very high intensity count rates, such as the count rates obtained in the first time period 604, it may be difficult to achieve a desired precision and accuracy in real time, especially if the neutron generation intensity is increased to make up for the burst gate time reduction to avoid neutron thermalization. These drawbacks can be mitigated if the real time requirement is relaxed. Rather than trying to process burst time data (e.g., data acquired in the first time period 604), the data can be recorded into onboard memory and then the processing of the data is done after the burst is over. Since this system is based on lower frequency pulsing, there may be relatively long idle time for the electronics. In that idle time, the data can be processed with processing algorithms that are more sophisticated than the ones used for the real time versions.

As shown in FIG. 6, a third time period 608 extends from the end of the first time period 604 and through the second time period 606. In various embodiments, this third time period 608 is longer than the second time period 606 and includes at least a portion of a waiting period 610 between the first time period 604 and the second time period 606. During the third time period 608, data processing may be performed on the data acquired during the first time period 604. In various embodiments, the data processing may be performed by an onboard processor and/or memory system. However, in other embodiments, the data may be transported, for example uphole, for processing with more sophisticated algorithms or more powerful computational resources. In contrast, the data acquired during the second time period 606 may be processed in real time, as the count rates may be lower than the count rates during the first time period 604. In this manner, idle times (e.g., the waiting period 610) may be utilized for data analysis. Furthermore, data processing can be performed in parallel during the third time period 608 and the second time period 606.

In various embodiments, one or more physical operations may be performed as a result of the information obtained from the acquired and/or processed information obtained from the measurement system 104. These physical operations may be directionally dependent or independent, and may further be specialized based on various wellbore characteristics that may be extrapolated from the gamma ray counts. Non-limiting examples include performing remediation operations for defects within the wellbore, deploying sensors for monitoring ongoing operations within the wellbore, targeting wellbore interventions (e.g., completion tasks, perforating tasks, formation stimulation, etc.), and the like.

Figure 7:
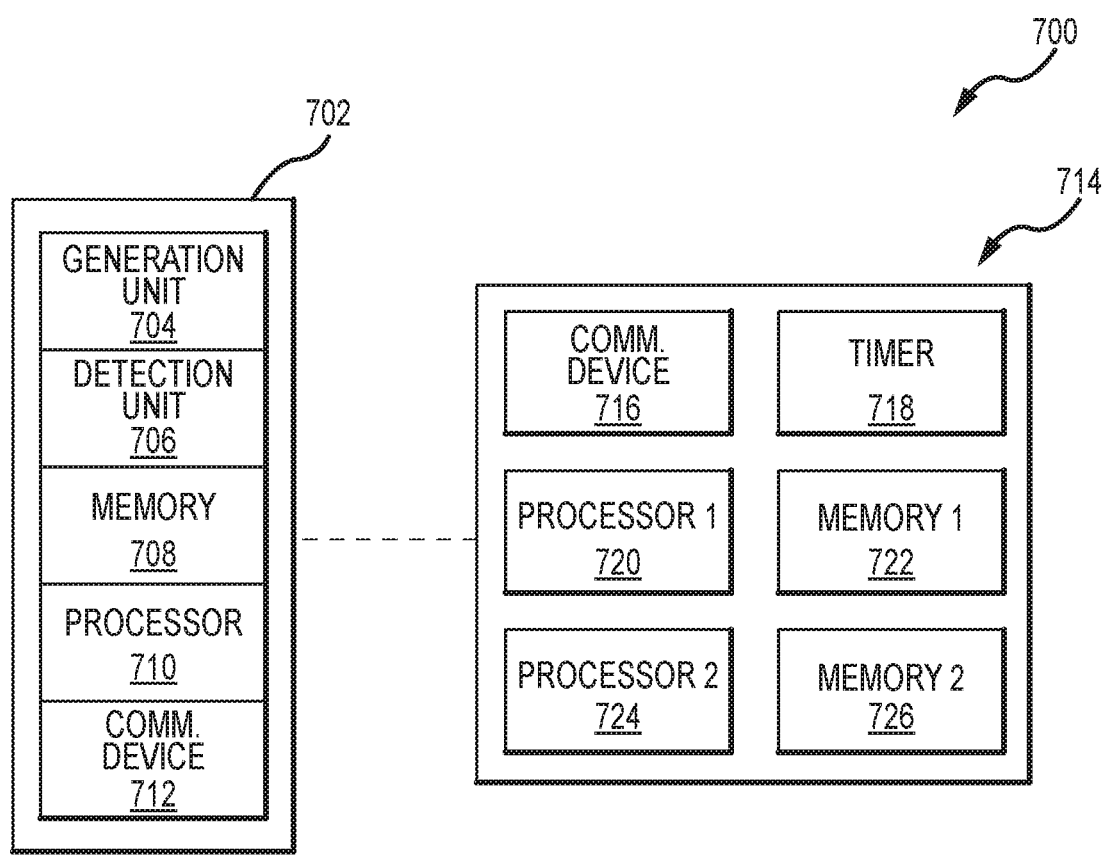
FIG. 7 is a block diagram of an embodiment of a measurement system, in accordance with embodiments of the present disclosure.

FIG. 7 is a block diagram of an embodiment of a measurement system 700. It should be appreciated that while various components of the measurement system 700 are illustrated and described as separate components, in various embodiments one or more of the components may be integrated with other components. The measurement system 700 includes a measurement device 702 including a neutron generation unit 704, which may be a pulsed neutron generation as described above, and a detection unit 706, which may be scintillation or semiconductor detector for detecting gamma rays, as described above. It should be appreciated that while the illustrated embodiment may include a single generation unit 704 and a single detection unit 706, that in various embodiments that may be multiple units 704, 706. For example, due to the short burst gate periods, there may be a reduction in the inelastic gamma counts. To compensate for the loss of counts, in various embodiments, multiple sources may be configured to fire simultaneously. Furthermore, in various embodiments, the detection unit 706 may include a plurality of detectors, as described above.

The illustrated measurement device 702 further includes a memory 708 and a processor 710. The memory 708 may be a non-transitory machine readable memory, such as a solid state drive, optical drive, mechanical drive, and the like. The processor 710 may be configured to receive instructions, for example from the memory 708, and process those instructions. In various embodiments, the memory 708, for example, my include instructions regarding the pulsing of the generation unit 704. It should be appreciated that, in various embodiments, the memory 708 and the processor 710 may be onboard the measurement device 702, as illustrated, but in other embodiments a separate downhole module of the tool string 106 may include at least one of the memory 708 and the processor 710. In various embodiments, the memory 708 and/or the processor 710 may be integrated into the detection unit 706 to record radiation detected by the detection unit 706. In various embodiments, the measurement device 702 also includes a communication device 712, which may be utilized to send and/or transmit data, such as instructions and/or data acquired by the measurement device 702 to one or wellbore components or to a surface location. For example, the communication device 712 may include wired or wireless communication systems, such as data transmission systems that communicate through the wireline 122, through wired drill pipe, through communication transmission lines arranged along the tool string 106, via wireless communication protocols such as Bluetooth®, Wi-Fi, 4G, mud pulse telemetry, or any other reasonable communication protocol. Accordingly, the measurement device 702 may communicate with the surface location and, in various embodiments, may include processing capability to perform various downhole operations.

The illustrated measurement system 700 also includes a control system 714, which may be arranged at a surface location or within a module in the downhole tool string 106. It should be appreciated that, in certain embodiments, the control system 714 may be integrated with the measurement device 702. The illustrated control system 714 includes a communication device 716, which may be similar to the communication device 712 to facilitate communication between components of the tool string 106 and/or a surface location. The illustrated control system 714 also includes a timer 718, which may be used to determine the delay period 508, which may be transmitted to the generation unit 704. For example, the timer 718 may record periods of time between pulses and, through communication with one or more components of the control system 714, transmit instructions to the generation unit 704 to emit more neutrons. In various embodiments, the control system 714 includes a first processor 720, a first memory 722, a second processor 724, and a second memory 726. In certain embodiments, the processor 720, 724 may be configured to run in parallel to process information from the first time period 604 and the second time period 606 substantially simultaneously. For example, the first processor 720 may process data throughout the third time period 608 and the second processor 724 may process data in real time from the second time period 606. In this manner, any down time in the electronics may be utilized for data processing.

In various embodiments, various instrumentation units and data collection units may be utilized that may include a digital and/or an analog system. For example, the measurement system 104 may include digital and/or analog systems. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure.

Figure 8:
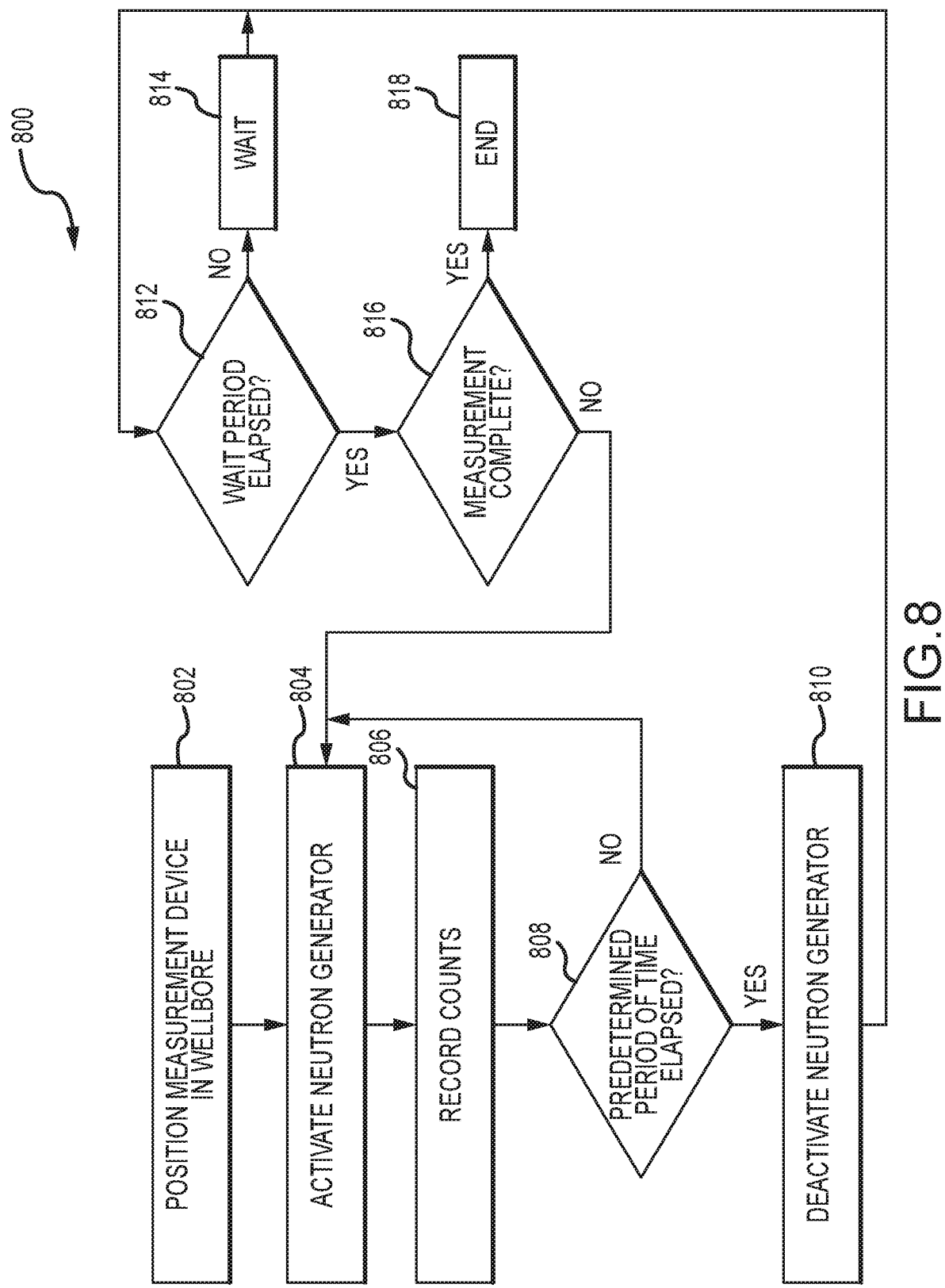
FIG. 8 is a flow chart of an embodiment of a method of performing pulsed neutron measurement, in accordance with embodiments of the present disclosure.

FIG. 8 is a flow chart of an embodiment of a method 800 for performing a pulsed measurement process. It should be appreciated for this method and all methods described herein that the steps may be performed in any order, or in parallel, unless otherwise explicitly stated. Moreover, there may be more or fewer steps and certain steps may be omitted, in certain embodiments. In this example, the method 800 includes positioning the measurement device 200 within the wellbore 108 (block 802). For example, the measurement device 200 may be positioned proximate a particular portion of the wellbore 108 to interrogate the well structure 102 and/or determine formation properties. The neutron generation unit 202 is activated (block 804). For example, the neutron generation unit 202 may be a pulsed neutron generator that emits high energy neutrons during a period of time, such as the burst gate. The counts may be recorded (block 806), for example the count may be associated with gamma rays detected by the detection unit 204. In various embodiments, the recordation of counts continues throughout the process. That is, the neutron detection unit 204 may continue to record gamma rays throughout the period of time the neutron detection unit 204 is arranged downhole. However, in various embodiments, the counts recorded during the burst gate may be directed primarily toward high energy neutrons. A predetermined burst period may be evaluated (block 808). If the period has not elapsed, the activation of the neutron generation 204 continues. If the period has elapsed, the neutron generation unit 202 is deactivated (block 810). As noted above, the counts may be recorded even after the neutron generation unit 202 is deactivated. For example, the counts after the neutron generation unit 202 is deactivated may be directed to the capture gate, as described above, and may be recording prompt gammas emitted through absorption of thermal neutrons.

In various embodiments, a wait period is analyzed (block 812). The wait period may correspond to the delay period 508, in which the thermal neutrons are allowed to be absorbed and dissipate in energy. As described above, this delay period 508 may prevent the build up associated with rapid pulse periods, which may obscure detection of the inelastic spectrum. If the wait period has not elapsed, the waiting may continue (block 814). If the wait period has elapsed, the measurement process is evaluated for completion (block 816). If complete, the method ends (818). If the measurement process is not complete, the neutron generation unit 202 is activated for another round of data acquisition. In this manner, the pulsed neutron generator may be utilized to determine the inelastic and capture gates by waiting for a period of time between bursts to prevent or reduce build up or overlap of various spectra.

Figure 9:
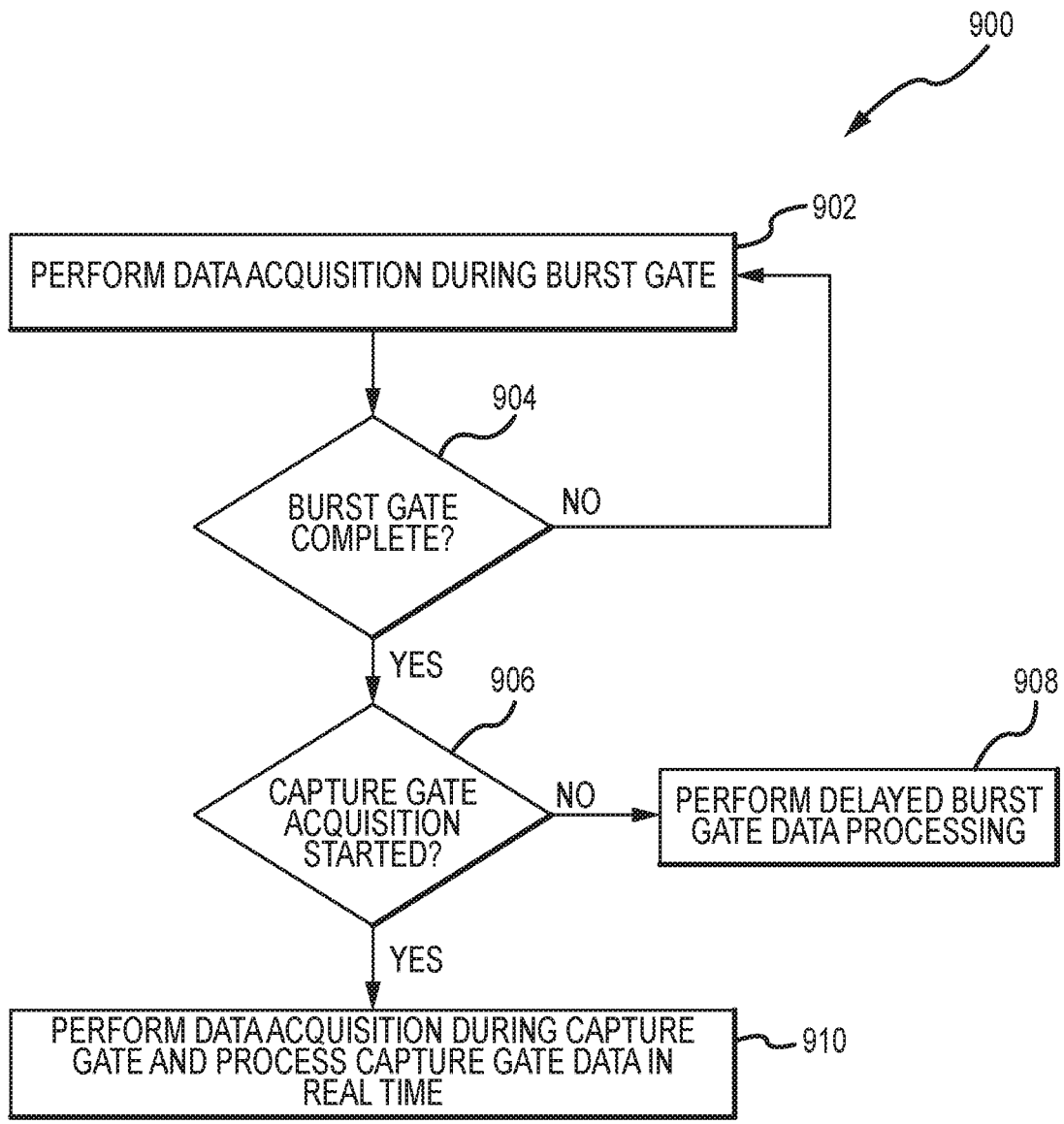
FIG. 9 is a flow chart of an embodiment of a method of data processing, in accordance with embodiments of the present disclosure.

FIG. 9 is a flow chart of an embodiment of a method 900 for performing data processing. In this example, data acquisition is performed during the burst gate (block 902). For example, the detection unit 204 may capture data indicative of inelastic scattering and also, to a smaller extend, prompt gammas from capture reactions. It should be appreciated that, in various embodiments, the inelastic scattering will comprise a larger quantity of the data acquired during this time period. Analysis of the burst gate completion is performed (block 904) and acquisition continues throughout the burst gate. If the burst gate is complete, the method may determine whether the capture gate has started (block 906). The capture gate may be defined as a period of time where a certain proportion of fast neutrons have been thermalized. It should be appreciated that neutron thermalization may vary based on the media in which the neutrons are emitted. If the capture gate has not started, data processing for the burst gate may begin (block 908). Because the quantity of information obtained during the burst gate may be large, it may be advantageous to delay processing of the data until after acquisition. For example, additional processing may be performed by processors having improved computing capacity. In various embodiments, the data acquired during the burst gate is stored in memory and transported to a control system for processing. If the capture gate has begun, data acquisition and real time or near-real time processing may begin (block 910). Because the data acquired during the capture gate may be sufficient for real or near-real time processing, the data may be processed as it is acquired, rather than storing the data and processing the data later. However, it should be appreciated that the data may also be stored, for example to onboard memory, and transmitted or stored for later processing.

In various embodiments, one or more physical operations may be performed as a result of the information obtained from the measurements obtained using systems and methods described herein. Non-limiting examples include performing remediation operations for defects within the wellbore, deploying sensors for monitoring ongoing operations within the wellbore, targeting wellbore interventions (e.g., completion tasks, perforating tasks, formation stimulation, etc.), and the like.

In various embodiments, various instrumentation units and data collection units may be utilized that may include a digital and/or an analog system. For example, various downhole tools may include digital and/or analog systems. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:
    activating a neutron generation unit operable to emit neutrons toward a target for a first period of time;
    receiving first measurement data, via a detection unit, during the first period of time;
    storing the first measurement data;
    deactivating the neutron generation unit after the first period of time;
    processing at least a portion of the stored first measurement data after the first period of time, the first measurement data being correlated to a burst gate;
    receiving second measurement data, via the neutron detection unit, during a second period of time, the second measurement data being correlated to a capture gate; and
    processing the second measurement data during the second time period, wherein at least a portion of the first measurement data is processed in parallel with the second measurement data.

2. The method of claim 1, further comprising:
    activating the neutron generation unit for a third period of time after a delay period between a start of the third period of time and an end of the capture gate, wherein the delay period is long enough for a significant portion of thermal neutrons to be captured.

3. The method of claim 1, wherein a significant amount of neutrons are not thermalized during the first period of time.

4. The method of claim 1, further comprising:
    processing at least a portion of the first measurement data during a fourth period of time, the fourth period of time extending from an end of the first period of time to an end of the capture gate.

5. The method of claim 1, wherein the second period of time corresponds to a thermal neutron reactions period for neutrons emitted from the neutron generation unit.

6. The method of claim 1, wherein the neutron generation unit is a pulsed neutron generator and the detection unit includes at least one gamma ray detector.

7. A computing device, comprising:
    a microprocessor; and
    memory including instructions that, when executed by the microprocessor, cause the computing device to:
        obtain first measurement data from a detection unit, the first measurement data recorded during a burst gate of a neutron generation unit;
        obtain second measurement data from the detection unit, the second measurement data recorded during a capture gate of the neutron generation unit, the capture gate starting after a waiting period from an end of the burst gate;
        process at least a portion of the first measurement data during the waiting period;
        process at least a portion of the second measurement data during the capture gate; and
        process at least a portion of the first measurement data during the capture gate in parallel with the second measurement data.

8. The computing device of claim 7, wherein the memory includes instructions that, when executed by the microprocessor, further cause the computing device to:
    cause the neutron generation unit to emit neutrons for a first period of time corresponding to the burst gate, wherein less than a thermal threshold number of thermal neutrons are created during the burst gate;
    cause the neutron generation unit to stop emitting neutrons after the first period of time; and
    cause the neutron generation unit to emit neutrons for a second period of time corresponding to a second burst gate after a delay period, the delay period being long enough for more than an absorption threshold number of thermal neutrons to be absorbed.

9. The computing device of claim 8, wherein the delay period begins after the capture gate, a start of the delay period corresponding to a period of time when a number of counts recorded within the capture gate falls below a threshold.

10. The computing device of claim 7, wherein the neutron generation unit is a pulsed neutron generator and the detection unit includes at least one gamma ray detector.

11. The computing device of claim 7, wherein the waiting period corresponds to a thermalization period for neutrons emitted by the neutron generation unit.

12. The computing device of claim 7, wherein the memory includes instructions that, when executed by the microprocessor, further cause the computing device to:
    store the first measurement data to a second memory; and
    transmit the first measurement data to the memory.

13. The computing device of claim 7, wherein the memory includes instructions that, when executed by the microprocessor, further cause the computing device to:
    correlate the first measurement data with reactions associated with inelastic scattering; and
    correlate the second measurement data with reactions associated with neutron capture.

14. A system for conducting measurement operations, the system comprising:
    a neutron measurement device forming at least a portion of a downhole tool string, the neutron measurement device operable to generate measurement data for detecting a wellbore characteristic, wherein the neutron measurement device comprises:
        a neutron generator operable to emit neutrons toward a target;
        a plurality of detectors fixed relative to the neutron generator and operable to detect gamma rays from the target;
    a microprocessor; and
    memory including instructions that, when executed by the microprocessor, cause the system to:

activate the neutron generator for a first period of time;
store first measurement data during the first period of time;
deactivate the neutron generator after the first period of time;
disregard second measurement data during a second period of time, the second period of time being after the first period of time;
record third measurement data during a third period of time, the third period of time being after the second period of time;
process at least a portion of the first measurement data during the second period of time and the third period of time; and
process at least a portion of the third measurement data during the third period of time, wherein at least a portion of the first measurement data is processed in parallel with at least a portion of the third measurement data.

15. The system of claim 14, wherein the first period of time corresponds to a burst gate and the first measurement data corresponds to inelastic scattering.

16. The system of claim 14, wherein the third period of time corresponds to a capture gate and the third measurement data corresponds to capture gamma rays.

17. The system of claim 14, wherein the memory includes instructions that, when executed by the microprocessor, further cause the system to:
activate the neutron generator for a fourth period of time, the activation occurring after a waiting period from an end of the capture gate.

* * * * *